United States Patent [19]

Shibazaki

[11] Patent Number: 5,477,394
[45] Date of Patent: Dec. 19, 1995

[54] PROJECTOR

[75] Inventor: Shigeru Shibazaki, Chiba, Japan

[73] Assignee: Sharp Kabushiki Kaisha, Osaka, Japan

[21] Appl. No.: 245,899

[22] Filed: May 19, 1994

[30] Foreign Application Priority Data

Jun. 23, 1993 [JP] Japan .................................. 5-151893

[51] Int. Cl.⁶ .............................. G02B 5/10; G03B 21/28
[52] U.S. Cl. ........................... 359/858; 359/861; 353/37; 353/78; 353/99
[58] Field of Search .................... 359/364, 365, 359/727, 730, 731, 857, 858, 859, 861; 353/37, 50, 51, 99, 64, 66, 73, 77, 78; 362/297, 298

[56] References Cited

U.S. PATENT DOCUMENTS

| | | | |
|---|---|---|---|
| 2,165,078 | 7/1939 | Toulon | 359/857 |
| 2,819,649 | 1/1958 | McLeod et al. | 359/858 |
| 2,860,557 | 11/1958 | Moore et al. | 359/858 |
| 3,674,334 | 7/1972 | Abeoffner | 359/859 |
| 4,765,733 | 8/1988 | Negishi | 353/99 |
| 4,971,436 | 11/1990 | Aoki et al. | 353/37 |

FOREIGN PATENT DOCUMENTS

| | | |
|---|---|---|
| 63-73792 | 5/1988 | Japan . |
| 2-3556 | 1/1990 | Japan . |
| 2-157734 | 6/1990 | Japan . |
| 4-38346 | 9/1992 | Japan . |

OTHER PUBLICATIONS

Patent Abstracts of Japan vol. 14, No. 405 (P–1100) 31 Aug. 1990 & JP–A–02 157 734 (Hosiden Electron) 18 Jun. 1990.
Patent Abstracts of Japan vol. 17, No. 375 (E–1397) 14 Jul. 1993 & JP–A–05 062 877 (Yasuko Shinohara) 12 Mar. 1993.

Primary Examiner—Ricky D. Shafer

[57] ABSTRACT

A projector has a shortened optical path from a light valve to a screen and a reduction in the depth size of its system, and requires less space to mount. Rays of light emitted from a light valve of the projector are refracted by a converging lens and reflected by a plane mirror to converge at the primary focal point of an elliptical mirror, and then travel toward the secondary focal point whereat the focal point of a parabolic mirror also exists and a projection lens is disposed. The light rays pass through the projection lens, are reflected by the parabolic mirror and then are brought to a parallel beam of light that is further collected by a Fresnel lens to finally form an image on a lenticular lens-screen.

2 Claims, 9 Drawing Sheets

PROJECTOR

BACKGROUND OF THE INVENTION

The present invention relates to a projector and, more particularly, to a projector which is devised to have a shorter optical path from the light valve to the screen by applying the combination of an elliptical mirror and a parabolic mirror for projecting, or a combination of two parabolic mirrors for projecting or a combination of a parabolic mirror and an elliptical mirror for projecting.

A conventional projector is composed of a light source, a liquid-crystal type light-valve (with a single liquid-crystal panel or three liquid-crystal panels to include a spectroscopic system), a projection lens and plane mirrors (single or two piece), and a combination unit comprising of a Fresnel lens and a lenticular one that is, a lens and screen. They work on the same well-known principle as a cathode ray tube (CRT) works. It is well known that the size of the depth of the projector's casing, accommodating therein an optical path from the liquid-crystal type light valve to the screen, mainly depends upon the size of the projection mirror (plane mirror) placed immediately before the screen. Many attempts have been made to produce a projector having a shorter optical path.

A projector is disclosed in the Japanese laying-open Utility Model No. 63-73792. This is a liquid display which includes a casing with a display window provided with a front transparent screen and which includes therein a transparent liquid-crystal display panel, a light source for illuminating the liquid-crystal display panel from the back and a projection lens for projecting an enlarged image of the liquid-crystal display panel onto the screen. In the casing, a prism having a light-emitting plane larger than the display window is placed with its light-emitting surface in contact with or near the internal surface of the display window and width its incident plane opposed to the projection lens directly or through the mirrors indirectry. The liquid-crystal display panel is placed opposite the projection lens directly or indirectly through the mirror.

A projector is disclosed in the Japanese Utility Model publication No. 4-38346, wherein rays of light images from a liquid-crystal display panel, reflected by the plane mirror, pass through the projection lens and are reflected by the plane mirrors to form an image on the screen.

A projector is disclosed, wherein rays of light emitted from the liquid-crystal panel through the projection lens are collected by a Fresnel lens to form an image on the lenticular screen. It is high-lighted by placing the liquid-crystal panel in a tilted state.

A projector is disclosed in the Japanese laying-open Patent No. 2-3556, wherein rays of light emitted from the light valve and disposed in a casing are reflected at the totals reflection mirrors which are disposed parallel to each other in the casing and form an image on the screen composed of a Fresnel lens and a lenticular one. This lenticular screen is of a flap type in order to reduce the size of the depth of the projector while it is out of use.

The Japanese laying-open Patent No. 2-157734 describes a conventional projection device that is composed of a light source, reflecting mirrors No. 1, 2 and 3, a color-active,i liquid-crystal display and a screen with the purpose of attaining a reduced light loss in its optical system, a shortened optical path to a screen and a simple construction. The first reflecting mirror reflects incident light from the light source by its curved surface to produce a parallel light beam falling onto the color-active liquid-crystal display that transmits or shuts off the incident light for a pixel. The second reflecting mirror reflects a parallel beam of incident light transmitted through the color-active liquid-crystal display causing the light to enter into a third reflecting mirror which in turn reflects the incident light from the second reflecting mirror to project an image onto a screen.

As mentioned above, any conventional projector has an insufficiently shortened optical path: its optical system, therefore, is merely saved in depth size when being mounted on the floor or a wall.

For instance, the projectors have the depth sizes reduced to some extent by tightly placing the mirrors and the screen therein. However, they are not so small as to be called thin types.

The projector employs a total reflection-type prism which may involve leakage of external light causing considerable deterioration of the image to be formed. The application of the prism may also increase the projector's weight.

Both the projectors use a plurality of mirrors around a screen, aiming at reducing the size of a reflecting mirror before the screen. However, it is not effective to reduce the depth size of the projector. Moreover, multi-reflection may considerably effect the projected image's brightness,

SUMMARY OF THE INVENTION

It is an object of the present invention to provide a projector which has a shortened optical path and a reduced depth size to its system and which requires a small space to mount on the floor or a wall.

It is another object of the present invention to provide a projector which has a shortened optical path and a reduction in the depth size of its optical system and which requires less space to mount on the floor or a window owing to its optical system. In the projector, rays of light emitted from a light valve through a converging lens and a plane mirror are brought to a primary focal point and then to the secondary focal point of an elliptical mirror and pass through a projection lens placed at the secondary focal point. Then, the light rays of the projector are reflected by a parabolic mirror and collected by a Fresnel lens to finally form an image on a lenticular lens-screen.

It is another object of the present invention to provide a projector which has a shortened optical path and a reduction in the depth size of its optical system and which requires less space to mount on the floor or a window owing to its optical system. In the projector, rays of light from a light valve are reflected by a parabolic mirror, brought to a focal point and pass a projection lens placed at the parabolic mirror's focal point. Then the light rays of the projector are reflected again by a second parabolic mirror and collected by a Fresnel lens to form an image on a lenticular lens-screen.

It is another object of the present invention to provide a projector which has a shortened optical path and a reduction in the depth size of its optical system and which requires less space to mount on the floor or a window by adopting such an optical system. In the projector, the rays of light from a light valve are reflected by a parabolic mirror, brought to its focal point (common to the parabolic mirror and an elliptical mirror) and pass through a projection lens placed disposed at the parabolic mirror's focal point. Then the light rays of the projector are reflected by the elliptical mirror and collected by a Fresnel lens to form an image on a lenticular lens-screen.

Rays of light emitted from a light valve through a converging lens and a plane mirror are brought to the primary focal point of an elliptical mirror and further travel to a secondary focal point of the elliptical mirror, whereat a projection lens is disposed. The light rays are refracted by the projection lens and reflected by a parabolic mirror toward a Fresnel lens through which they are collected to form an image on a lenticular lens-screen (i.e. this lenticular works as a lens and a screen).

Rays of light emitted from a light valve are reflected by a parabolic mirror and brought to the mirror's focal point whereat a projection lens is disposed. The light rays are refracted by the projection lens and reflected by a second parabolic mirror toward a Fresnel lens by which they are collected to form an image on a lenticular lens-screen.

Rays of light emitted from a light valve are reflected by a parabolic mirror and brought to a focal point (common to the parabolic mirror and an elliptical mirror) whereat a projection lens is disposed. The light rays are refracted by the projection lens and reflected by the elliptical mirror toward a secondary focal point of the elliptical mirror. Then, they pass the focal point and are collected by a Fresnel lens to form an image on a lenticular lens-screen.

To realize the above-mentioned objects, the present invention was made to provide:

(1) a projector comprising an elliptical mirror having a primary focal point and a secondary focal point, a light valve for emitting rays of light, said rays of light converging at the primary focal point of the elliptical mirror through an optical lens, a projection lens disposed at the secondary focal point of the elliptical mirror, a parabolic mirror having its focal point existing at the secondary focal point of the elliptical mirror, whereby the rays of the parallel beam of light reflected by the parabolic mirror are collected to form an image;

(2) a projector comprising a light valve emitting a parallel beam of light, a first parabolic mirror causing the rays of the parallel beam of light to converge at its focal point, a projection lens disposed at the focal point of the first parabolic mirror, a second parabolic mirror that reflects the rays of the beam of the light from the projection lens to produce a parallel beam of light, whereby the rays of the parallel beam of light reflected by the second parabolic mirror are collected to form an image;

(3) a projector comprising a light valve for emitting a parallel beam of light, a parabolic mirror causing the rays of the parallel beam of light to converge at its focal point, a projection lens disposed at the focal point of the parabolic mirror, an elliptical mirror having a primary focal point coexisting with that of the parabolic mirror and reflecting the rays of the beam of light from the projection lens so that said rays converge at its secondary focal point, whereby the rays of the light reflected by the elliptical mirror are collected to form an image; or (4) a projector according to any one of items 1, 2 and 3, characterized in that it further comprises a light source and a beam splitter, and uses a reflection type liquid-crystal as the light valve.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

PREFERRED EMBODIMENT OF THE INVENTION

Figure 1A:
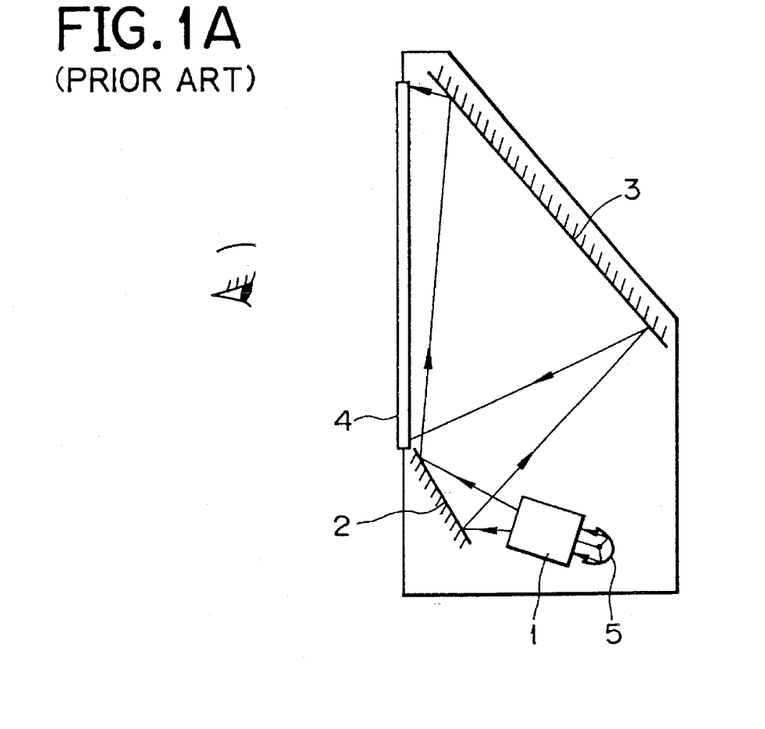
FIGS. 1A and 1B are a construction view of a conventional projector.
Figure 1B:
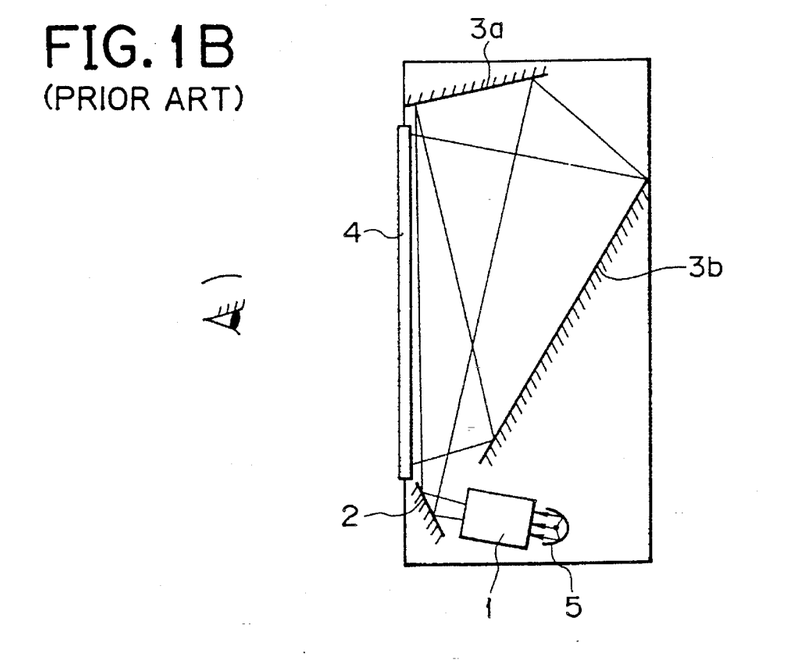

FIGS. 1A and 1B are construction views of conventional, rear-type projectors: FIG. 1A shows a two-time reflection-type projector and FIG. 1B shows a three-time reflection-type. In FIGS. 1A and 1B, 1 is a liquid-crystal type light valve, 2, 3a and 3b are plane mirrors; 4 is a combination of a Fresnel lens and a lenticular one; and 5 is a light source.

Each type of conventional projector is composed of a light source 5, a liquid-crystal type light-valve (with a single liquid-crystal panel or three liquid-crystal panels to include a spectroscopic system) 1, a projection lens and plane mirrors (single or two piece) 2, 3, and a combination unit 4 including of a Fresnel lens and a lenticular one that is, a lens and screen. They work on the same well-known principle as a cathode ray tube (CRT) works. It is well known that the size of the depth of the projector's casing, accommodating therein an optical path from the liquid-crystal type light valve 1 to the screen, mainly depends upon the size of the projection mirror (plane mirror) placed immediately before the screen. Many attempts have been made to produce a projector having a shorter optical path.

Figure 2A:
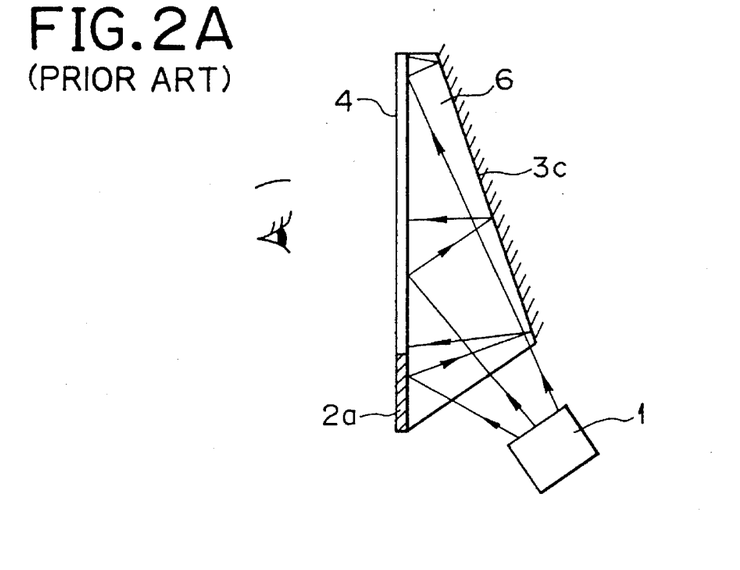
FIGS. 2A, 2B and 2C are another construction view of a conventional projector.
Figure 2B:
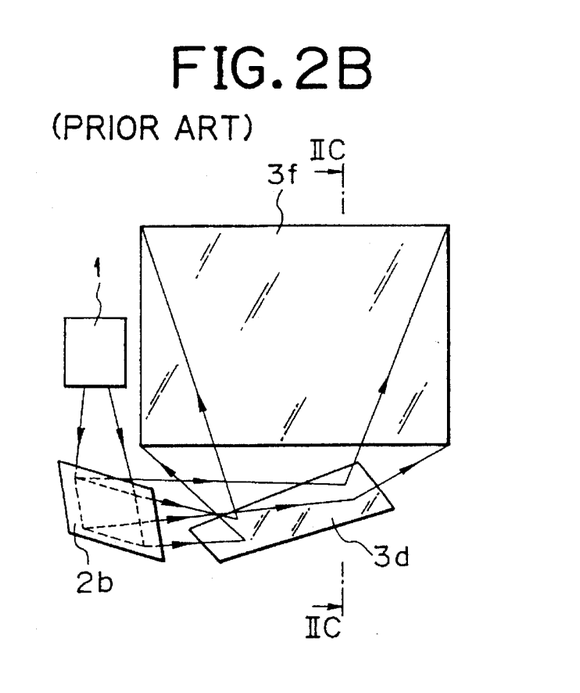
Figure 2C:
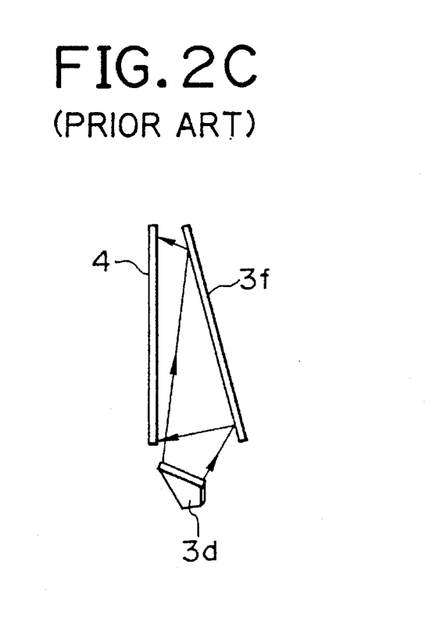
Figure 3A:
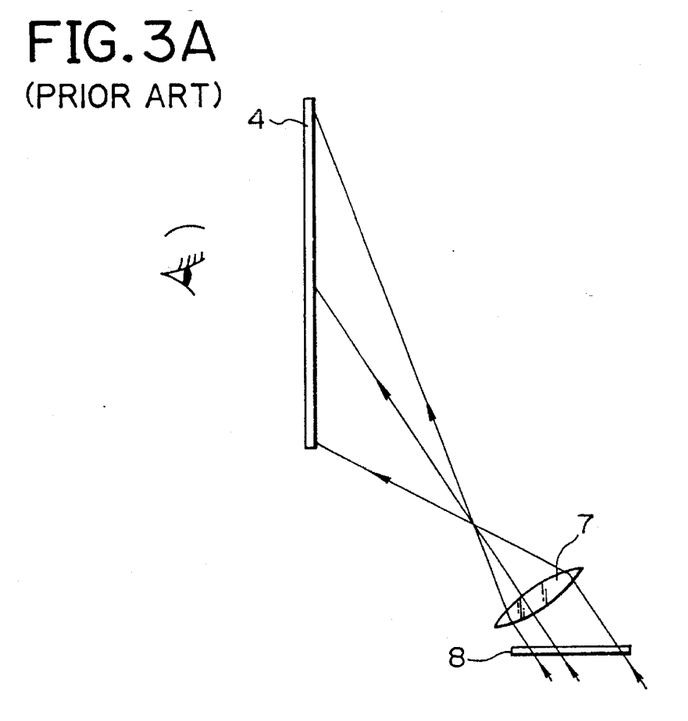
FIGS. 3A and 3B are still another construction view of a conventional projector.
Figure 3B:
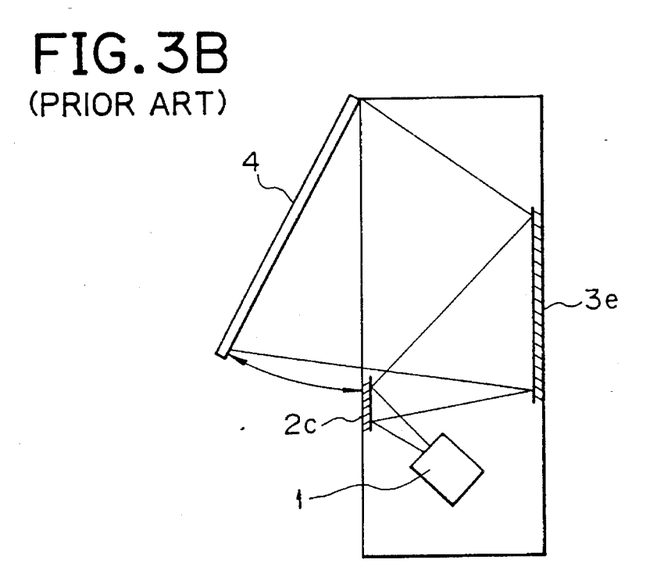

FIGS. 2A to 2C and FIGS. 3A and 3B show examples of reducing the length of the optical path of conventional projectors by applying a prism (FIG. 2A), placing a plurality of plane mirrors around a casing, placing a liquid-crystal panel in a tilted state (FIG. 3A) and reducing the size of the depth of the projector's casing (FIG. 3B). In FIGS. 2A–C and 3A–B, 2a, 2b, 3c, 3d and 3f are plane mirrors; 2c and 3e are total reflecting mirrors; 6 is a prism; 7 is a projection lens and 8 is a liquid-crystal panel. Other parts similar in function to those of FIGS. 1A and 1B are denoted by like reference numbers.

FIG. 2A shows a projector disclosed in the Japanese laying-open Utility Model No. 63-73792. This is a liquid display which has a casing with a display window provided with a front transparent screen and which includes therein a transparent liquid-crystal display panel, a light source for illuminating the liquid-crystal display panel from the back and a projection lens for projecting an enlarged image of the liquid-crystal display panel onto the screen. In the casing, a prism 6 having a light-emitting plane larger than the display window is placed with its light-emitting surface in contact with or near the internal surface of the display window with its incident plane opposed to the projection lens directly or through the mirrors 2a and 3c indirectly. The liquid-crystal display panel is placed opposite the projection lens directly or indirectly through the mirror. FIG. 2C is a section view along line IIC—IIC of FIG. 2B, and both projectors are disclosed in the Japanese Utility Model publication No. 4-38346, wherein rays of light images from a liquid-crystal display panel are reflected by the plane mirror 2b, pass through the projection lens and are reflected by the plane mirrors 3d and 3f to form an image on the screen 4.

FIG. 3A shows a projector wherein rays of light emitted from the liquid-crystal panel 8 through the projection lens 7 are collected by a Fresnel lens to form an image on the lenticular screen 4. It is high-lighted by placing the liquid-crystal panel in a tilted state.

FIG. 3B shows a projector disclosed in the Japanese laying-open Patent No. 2-3556, wherein rays of light emitted from the light valve 1 and disposed in a casing are reflected at the total reflection mirrors 2c and 3e which are disposed parallel to each other in the casing and form an image on the screen 4 composed of a Fresnel lens and a lenticular one. This lenticular screen 4 is of a flap type in order to reduce the size of the depth of the projector while it is out of use.

As mentioned above, any conventional projector has an insufficiently shortened optical path: its optical system, therefore, is merely saved in depth size when being mounted on the floor or a wall.

For instance, the projectors shown in FIGS. 1A and 1B have the depth sizes reduced to some extent by tightly placing the mirrors and the screen therein. However, they are not so small as to be called thin types.

The projector shown in FIG. 2A employs a total reflection-type prism which may involve leakage of external light causing considerable deterioration of the image to be formed. The application of the prism may also increase the projector's weight.

Both the projectors shown in FIGS. 2B and 2C use a plurality of mirrors around a screen, aiming at reducing the size of a reflecting mirror before the screen. However, it is not effective to reduce the depth size of the projector. Moreover, multi-reflection may considerably effect the projected image's brightness.

Figure 4:
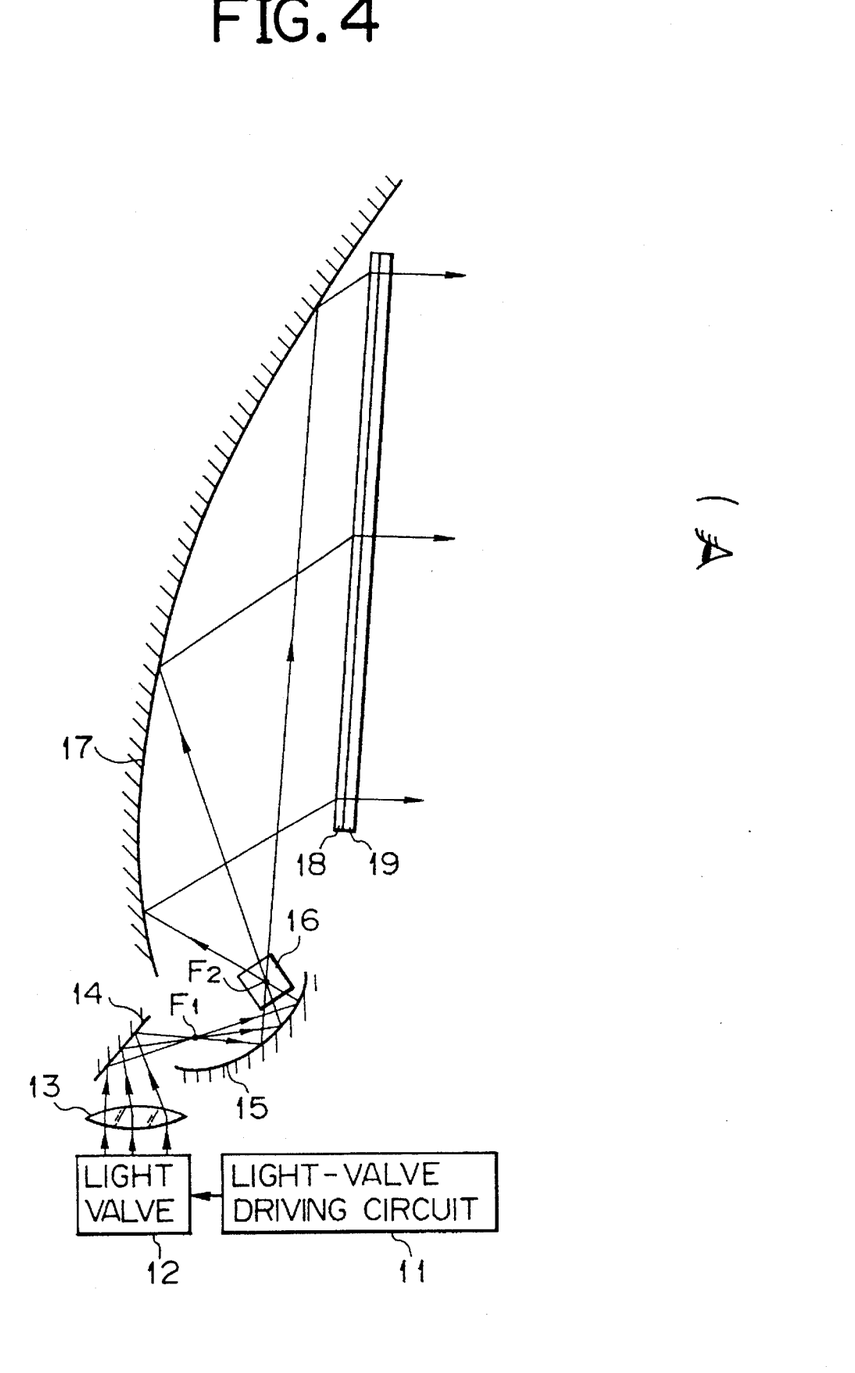
FIG. 4 is a construction view for explaining a projector embodied in the present invention.

Referring now to the accompanying drawings, preferred embodiments of the present invention will be described in detail as follows:

FIG. 4 is a construction view for explaining an example of a projector embodying the present invention, including a light-valve driving circuit 11, a light valve 12, a converging lens 13, a plane mirror 14, an elliptical mirror 15, a projection lens 16, a parabolic mirror 17, a Fresnel lens 18 and a lenticular lens-screen 19. The elliptical mirror 15 has a primary focal point F1 and a secondary focal point F2 that is also a focal point of the parabolic mirror 17.

The projector according to the present invention includes a light valve 12 having a self-illuminating display or a back-lighted display, a light-valve driving circuit 11, a converging lens 13, an elliptical mirror 15, a projection lens 16, a parabolic mirror (functioning as a projection mirror) 17, a Fresnel lens 18 and a lenticular lens-screen 19.

Rays of light emitted from the light valve through the converging lens 13 converge at the primary focal point F1 and travel to the elliptical mirror 15 by which the light rays are reflected toward the secondary focal point F2 that serves also as the focal point of the parabolic mirror 17. The light rays are refracted by the projection lens 16 disposed at the secondary focal point of the parabolic mirror 17 and then reflected by the parabolic mirror 17 which brings the light rays to a parallel beam of light. The parallel light beam is collected by the Fresnel lens 18 to form an image on the lenticular lens-screen 19. Since its optical system uses aspherical mirrors, the light rays emitted from the light valve 12 are considered corrected for image distortion.

Figure 5:
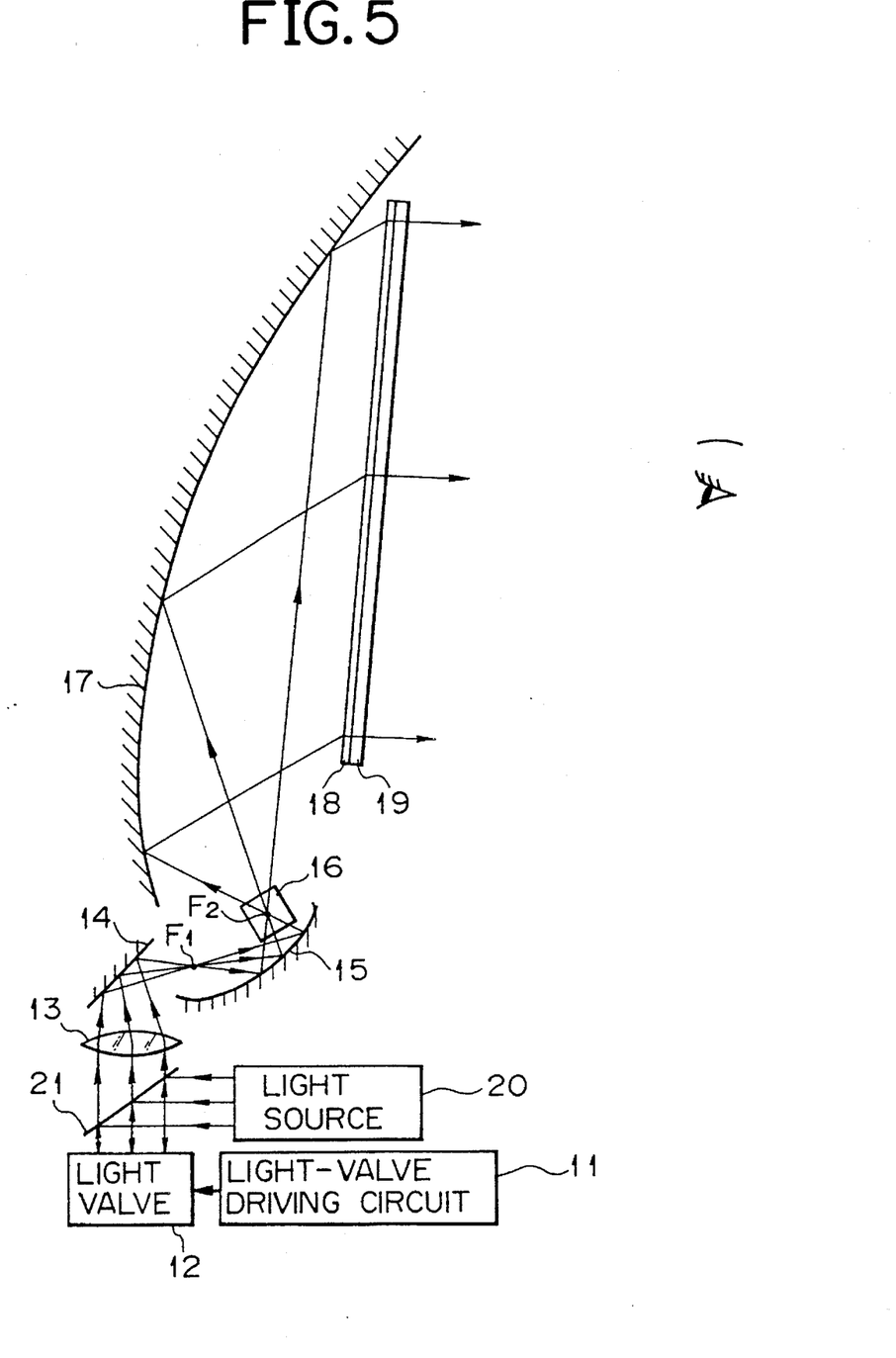
FIG. 5 is a view showing another example of a projector similar to that of FIG. 4.

FIG. 5 is a view showing another modification of the projector shown in FIG. 4. In FIG. 5, numeral 20 designates a light source and numeral 21 designates a beam splitter. Other components similar in function to those shown in FIG. 4 are denoted by like numerals.

This projector differs from the projector shown in FIG. 4 by being provided with a light source 20 and a beam splitter 21 and by using a reflecting type liquid-crystal device as a light valve 12.

Rays of light from the light source 20 through the beam splitter 21 enter into a light valve (reflecting type liquid-crystal) 12 from which they are emitted through a converging lens 13 and are reflected by a plane mirror 14. The reflected light rays converge at the primary focal point F1 of the elliptical mirror 15 and the travel toward the secondary focal point F2 that is also the focal point of the parabolic mirror 17 and whereat a projection lens 16 is disposed. The light rays are refracted by the projection lens 16 and reflected by the parabolic mirror 17 by which they are converted into a parallel beam of light which is then collected by a Fresnel lens 18 to form an image on the lenticular lens-screen 19.

Figure 6:
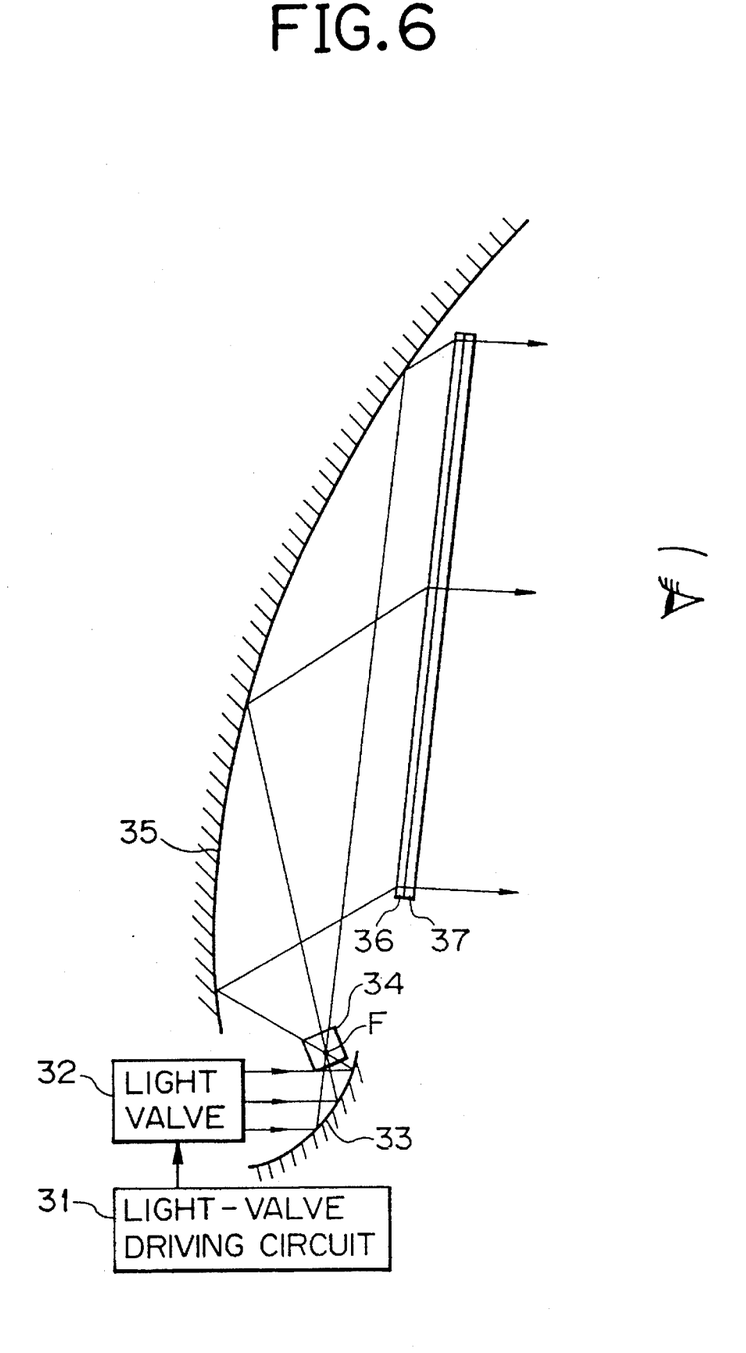
FIG. 6 is a construction view of another projector embodied in the present invention.

FIG. 6 is a view showing another embodiment of the present invention, including a light-valve driving circuit 31, a light valve 32, a first parabolic mirror 33, a projection lens 34, a second parabolic mirror 35, a Fresnel lens 36 and a lenticular lens-screen 37. The first parabolic mirror 33 and the second parabolic mirror 35 have a common focus F.

This projector, according to the present invention, includes a light valve 32 having a self-illuminating display screen or a back-lighted display screen, a light-valve driving circuit 31, a first parabolic mirror 33, a projection lens 34, a second parabolic mirror 35 working as a projection mirror, a Fresnel lens 36 and a lenticular lens-screen 37.

A parallel beam of light emitted from the light valve 32 converges to the focal point of the first parabolic mirror 33 and passes through the projection lens 34 disposed at the focal point thereof. Then the light rays are reflected by the second parabolic mirror 35 and converted into a parallel light beam which is then collected by a Fresnel lens 36 and then forms an image on the lenticular lens-screen 37. Since its optical system uses aspherical mirrors, the light rays emitted from the light valve 32 are considered corrected for image distortion.

Figure 7:
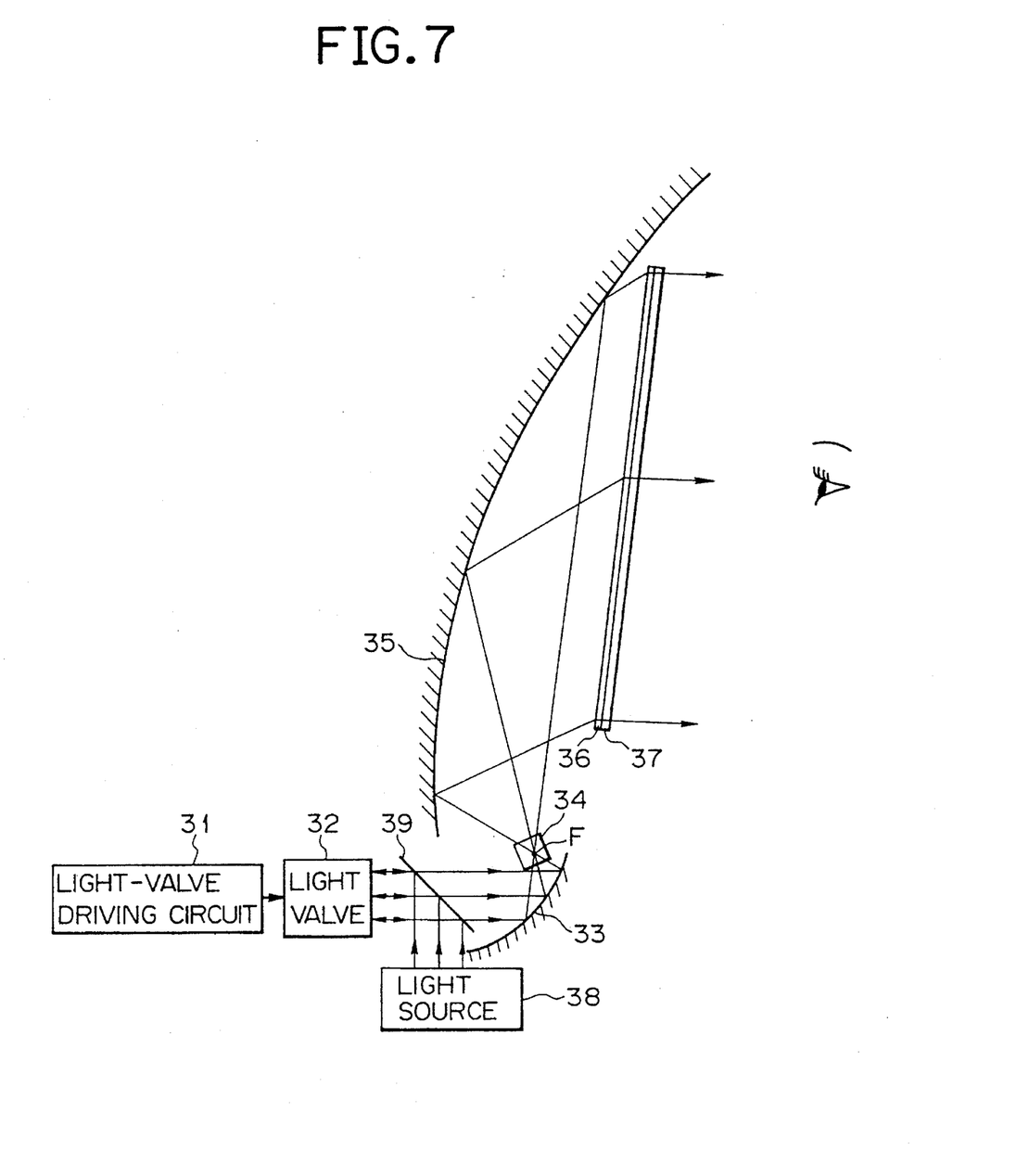
FIG. 7 is a view showing another example of a projector similar to that of FIG. 6.

FIG. 7 shows another modification of the projector shown in FIG. 6. In FIG. 7, numeral 38 designates a light source and numeral 39 is a beam splitter. Other components similar in function to those shown in FIG. 6 are denoted by like numerals.

This projector differs from that shown in FIG. 6 by being proved with the light source 38 and the beam splitter 39 and by using a reflecting type liquid-crystal as a light valve 32.

Rays of light from the light source 38 through the beam splitter 39 enter into the light valve (reflecting type liquid-crystal panel) 32 wherefrom a parallel beam of light is emitted and reflected by a first parabolic mirror 33 to converge at the focal point F of the first parabolic mirror 33, whereat it enters into a projection lens 34 placed at the focal point thereof. The rays of light refracted by the projecting lens 34 are reflected by a second parabolic mirror 35 so that they are converted into a parallel beam of light which is further collected by a Fresnel lens 36 and which forms an image on a lenticular lens-screen 37.

Figure 8:
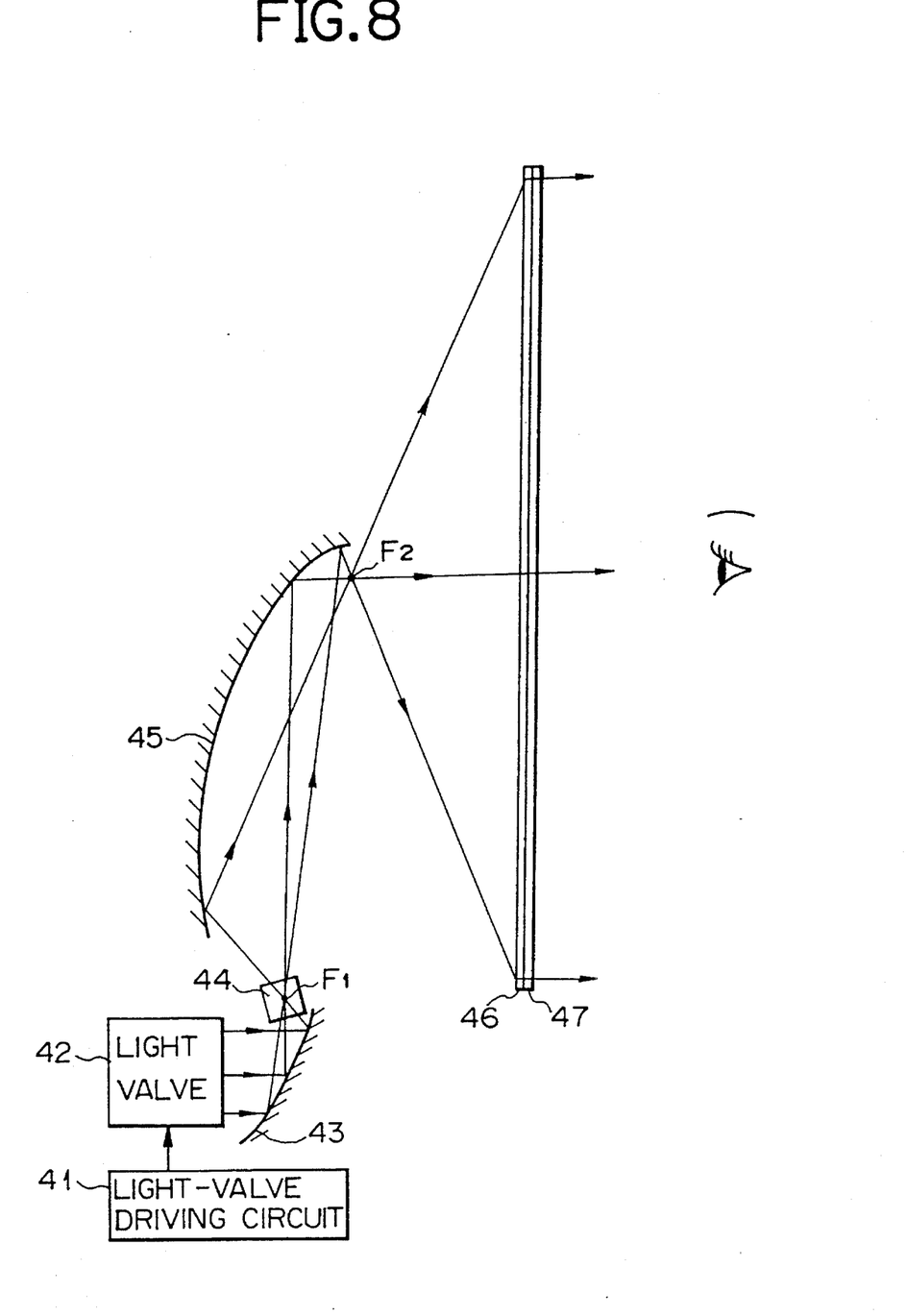
FIG. 8 is a construction view of another projector embodied in the present invention.

FIG. 8 is a view showing a further embodiment of the present invention, including a light-valve driving circuit 41, a light valve 42, a parabolic mirror 43, a projection lens 44, an elliptical mirror 45, a Fresnel lens 46 and a lenticular lens-screen 47. The elliptical mirror 45 has a primary focal point F1 and a secondary focal point F2, and the primary focal point F1 is also a focus of the parabolic mirror 43.

This projector according to the present invention includes a light valve 42 having a self-illuminating display or a back-lighted display, a light-valve driving circuit 41, a parabolic mirror 43, a projection lens 44, an elliptical mirror 45 (working as a projection mirror), a Fresnel lens 46 and a lenticular lens-screen 47.

A parallel beam of light emitted from the light valve 42 is reflected by the parabolic mirror 43 and converges at the primary focal point F1 of the elliptical mirror 45, entering into the projecting lens 44 disposed thereat. The rays of light from the projecting lens 44 are reflected by the elliptical mirror 45, pass through the secondary focal point F2 and then are collected by the Fresnel lens 46 to form an image on the lenticular lens-screen 47. Since its optical system uses aspherical mirrors, the light rays emitted from the light valve are considered corrected for image distortion.

Figure 9:
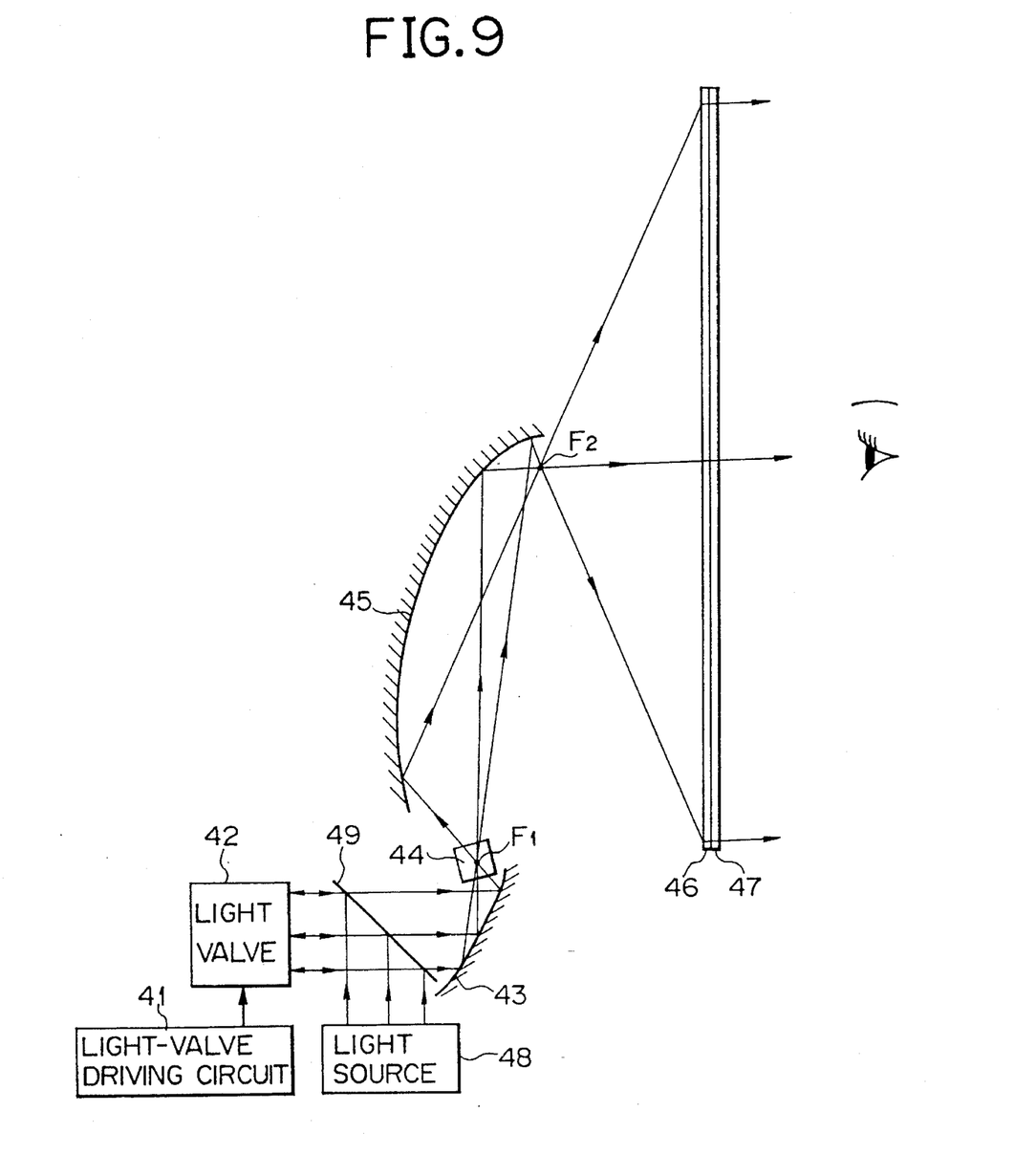
FIG. 9 is a view of another example of a projector similar to that of FIG. 8.

FIG. 9 shows another modification of the projector of FIG. 8. In FIG. 9 numeral 48 designates a light source and numeral 49 designates a beam splitter. Other components similar in function to those shown in FIG. 8 are denoted by like numerals.

This projector differs from the projector of FIG. 8 by being provided with a light source 48 and a beam splitter 49 and by using a reflecting-type liquid-crystal as a light valve 42.

Rays of light from the light source 48 through the beam splitter 49 enters into the light valve (reflecting type liquid-crystal panel) 42 wherefrom a parallel beam of light is emitted and reflected by a parabolic mirror 43 so that rays of the parallel beam of light converge to the focal point F1 of the parabolic mirror 43 and enter into a projection lens 44 disposed at the focal point thereof. The rays of light through the projection lens 44 are reflected by the elleptical mirror 45 by which they are brought to a parallel beam of light which is then collected by a Fresnel lens 46 to form an image on a lenticular lens-screen 47.

As many apparently widely different embodiments of this invention may be made without departing from the spirit and scope thereof, it is to be understood that the invention is not limited to the specific embodiments thereof except as defined in the appended claims.

I claim:

1. A projector, comprising:

an elliptical mirror having a primary focal point and a secondary focal point;

a light valve emitting rays of light converging into the primary focal point of the elliptical mirror through an optical system;

a projection lens disposed at the secondary focal point of the elliptical mirror; and a parabolic mirror having its focal point at the secondary focal point of the elliptical mirror so as to produce a parallel beam of light, whereby the rays of the parallel beam of light reflected by the parabolic mirror are collected to form an image.

2. The projector of 1, further comprising a light source and a beam spitter, wherein the light valve is a reflection type liquid-crystal display.

* * * * *